United States Patent [19]

Evans et al.

[11] Patent Number: 4,913,840
[45] Date of Patent: Apr. 3, 1990

[54] PRODUCTION OF STABLE ANIONIC SOLS CONTAINING COLLOIDAL ALUMINA HYDRATE

[75] Inventors: Kenneth A. Evans; Richard J. G. Hedley; Christopher F. Pygall, all of Bucks, England; Adrian K. A. Smith, Fife, Scotland; Kevin J. Wills, Slough Berkshire, England

[73] Assignee: Alcan International Limited, Quebec, Canada

[21] Appl. No.: 131,773

[22] Filed: Nov. 19, 1987

Related U.S. Application Data

[63] Continuation-in-part of Ser. No. 768,249, Aug. 22, 1985, abandoned, which is a continuation-in-part of Ser. No. 576,575, Feb. 3, 1984, abandoned.

[30] Foreign Application Priority Data

Feb. 3, 1983 [GB] United Kingdom ................. 8302952

[51] Int. Cl.$^4$ ...................... B01J 13/00; C01B 33/141
[52] U.S. Cl. ..................................... 252/313.2; 51/308; 106/38.35; 106/286.5; 252/309; 252/313.1; 252/315.7; 501/119
[58] Field of Search ................... 252/309, 313.1, 313.2; 106/286.5; 501/119

[56] References Cited

U.S. PATENT DOCUMENTS

| | | | |
|---|---|---|---|
| Re. 22,648 | 6/1945 | Heany | 501/119 |
| 1,373,854 | 4/1921 | Berry | 501/119 |
| 2,590,833 | 4/1952 | Bechtold et al. | 252/313.1 |
| 2,741,600 | 4/1956 | Allen | 252/313.2 |
| 2,915,475 | 12/1959 | Bugosh | 252/313.1 |
| 3,520,824 | 7/1970 | Plank et al. | 106/286.5 X |
| 3,576,652 | 4/1971 | Teicher et al. | 252/313.2 X |
| 3,860,431 | 1/1975 | Payne et al. | 252/313.2 X |
| 4,117,105 | 9/1978 | Hertzenberg et al. | 252/313.1 X |
| 4,244,835 | 1/1981 | Block | 252/313.1 |

OTHER PUBLICATIONS

"Plant and Equipment Survey Mixers—Part 2", *Processing*, Sep. 1981, pp. 29, 31, 33 & 35.
Kirk–Othmer, *Encyclopedia of Chemical Technology*, Third Edition, vol. 2, John Wiley & Sons, Inc., 1978, pp. 223 & 224.
Conoco Catapal ®, SB Alumina Data Sheet, 10–1977.

*Primary Examiner*—Richard D. Lovering
*Attorney, Agent, or Firm*—Browdy & Neimark

[57] ABSTRACT

Stable alkaline sols of anionic alumina hydrate may be made by calcining alumina trihydrate and milling the monohydrate produced under alkaline conditions. Alkaline sols containing both anionic alumina hydrate and anionic colloidal silica may be used for bonding refractory bodies.

14 Claims, No Drawings

PRODUCTION OF STABLE ANIONIC SOLS CONTAINING COLLOIDAL ALUMINA HYDRATE

This application is a continuation-in-part of application Serial No. 768,249, filed 8/22/85, now abandoned in favor of the present case, itself a continuation-in-part of Application Ser. No. 576,575 filed 2/3/84, abandoned in favor of Ser. No. 768,249.

This invention relates to alumina sols. It also relates to the use of alumina sols in admixture with other sols as binding agents.

There are known alumina sols comprising colloidal dispersion of alumina hydrate particles in water. The alumina hydrate may be an alumina monohydrate such as boehmite. Such sols may be prepared by various methods, including hydrolysis of organic aluminium compounds, bubbling carbon dioxide through a solution of sodium aluminate and autoclaving an aqueous slurry containing boehmite. In all these known methods the alumina dispersion produced is stabilized by the presence of an acid, giving a pH value of the dispersion which is typically about 4-5, otherwise the solid alumina constituent will precipitate out of the dispersion or gel.

These acid sols are cationic, i.e. the particles of alumina compound carry positive electric charges and the sol ceases to be stable if the acid is neutralised, so that the pH value increases to 7 or beyond, or if the sol is mixed with an anionic sol in which the dispersed particles carry negative charges. When a cationic sol is mixed with an anionic sol a gel, which cannot be redispersed as a sol, is generally formed.

Sols comprising dispersion of colloidal silica in water are used as binding agents, especially for refractory compositions. The binding and refractory properties of these silica sols may be improved by the addition of alumina as it is then possible to produce, on firing, an alumino-silicate compound such as mullite as the binding compound. However these silica sols are anionic and if they are mixed with more than say, 15% cationic alumina sols, a non-dispersible gel which cannot be used in a binding system is formed.

U.S. Pat. No. 2,915,475 to Bugosh discloses a method of making fibrous alumina monohydrate in which an aqueous solution of a basic aluminium salt is heated in the presence of a strong acid, whereupon the alumina precipitates in the form of long fibrils which may have one or more dimensions in the colloidal range.

U.S. Pat. No. 2,590,833 to Bechtold et al describes preparation of a colloidal dispersion of alumina by precipitation from a solution of an aluminium salt in the presence of a base, followed by filtration and washing to remove anions, agitation to form a suspension, heating and shearing by means of a colloid mill. The colloid mill has the function of dispersing the colloidal particles, which are already of colloidal size. The particles obtained are positively charged.

U.S. Pat. No. 3,520,824 to Plank et al describes peptising of a silica-alumina hydrogel in the presence of ammonia to form a hydrogel. The silicaalumina hydrogel contains a high proportion of silica and may be "Durabead I" which is a silica-alumina compound containing about 90% silica and 10% alumina. The hydrogel is prepared by precipitation of water glass in an acid solution containing an aluminium compound.

U.S. Pat. No. 4,244,835 to Block describes production of an aqueous dispersion of an alumina hydrate, such as Catapal SB by subjecting a mixture of aluminium hydrate particles and water to high shearing rates. The aluminium hydrate of the desired particle size is made by precipitation from solution or by hydrolysis of an alcoholate. The shearing rates taught by Block do not reduce the size of the particles, the particle size (less than 9 nm) is determined by the precipitation conditions used. When the dispersion obtained by Block is dried or neutralised a gel, and not a powdery dry product which can be redispersed, is formed.

U.S. Pat. No. 4,117,105 to Hertzenberg et al describes production of a dispersible alumina monohydrate by calcining alumina trihydrate, followed by slurrying in water and autoclaving to produce recrystallisation and rehydration. In this process the product obtained on calcination is a largely amorphous, partly dehydrated alumina trihydrate which recrystallises on autoclaving to give crystallized particles of size in the range 5 to 1000 nm.

According to the present invention, there is provided a method of making a stable alkaline sol containing anionic colloidal alumina hydrate which comprises the steps of:

(a) calcining alumina hydrate to form coarse particles of crystalline alumina monohydrate, and (b) reducing the average diameter of the coarse particles so formed to less than 1 micron in all dimensions by attrition milling said coarse particles with a dispersion liquid to produce a colloidal dispersion of the particles in the liquid.

A "stable" sol is one in which the colloidal material remains in the dispersed state on storage over an extended period.

The method of the invention allows a stable sol to be made by the simple steps of calcining alumina trihydrate, from the Bayer process, and milling the calcined product with the dispersion liquid in an attrition mill to reduce the particle size to colloidal proportions and form the stable sol. A ball mill may be used for the milling. The method is much cheaper and simpler than those of the prior art, in which particles of the required size are made by precipitation processes or by autoclaving.

The alumina trihydrate used as the starting material should be relatively coarse, that is having an average particle diameter substantially greater than 1 micron. A typical starting material has a particle diameter of about 50 microns. Calcination of alumina trihydrate particles which are already of colloidal dimensions (about 1 micron) does not produce the required crystalline alumina monohydrate which forms a stable colloidal dispersion.

The alumina monohydrate obtained by calcining coarse alumina trihydrate is well-crystallised boehmite. The liquid in which the alumina monohydrate is dispersed may be water.

As the particles of an anionic sol are negatively charged the sol has to be alkaline for the sol to be stable and a pH value of 10-14 is preferred. The necessary pH value can be achieved by incorporating an alkali such as sodium hydroxide in the sol. For many applications a sol having a concentration of 25-30g dispersed solid, measured as $Al_2O_3$, per 100 ml is convenient but higher concentrations, for example 45g $Al_2O_3$/100 ml, may be provided.

The sol may be dried to a powder and reconstituted as a sol by agitating the powder with water. The alumina hydrate particles in the sol may comprise gibbsite, boehmite or a psuedo-boehmite.

The anionic alumina hydrate sol is stable on prolonged storage and generally has thixotropic properties.

The temperature of calcining is generally from 300° C. to 750° C.

The alumina trihydrate may be calcined at a temperature of the order of 400° C. and cooled substantially to ambient temperature before milling. The alumina monohydrate may be quenched in cold water immediately after calcining. It has been found that such quenching reduces the milling time required to produce the sol.

The liquid medium of the sol should be alkaline to produce a stable anionic sol and an alkali such as sodium hydroxide may be added to the liquid for this purpose. However when the alumina trihydrate is obtained from bauxite by the Bayer process there may be sufficient residual alkali present in the alumina trihydrate to make a separate addition of alkali unnecessary.

According to another aspect of the invention, there is provided an anionic sol containing both colloidal alumina hydrate and colloidal silica in the dispersed state.

This sol may be made simply by mixing the anionic alumina sol with an anionic silica sol. The anionic alumina sol may be made by the process mentioned above. The silica gel may be of a type known in the art.

Alternatively, a stable mixed alkaline sol containing anionic colloidal alumina hydrate and anionic colloidal silica may be made by the method of making the stable sol of anionic colloidal alumina hydrate described above but using a dispersion of colloidal silica as the dispersion liquid.

In a further alternative, such a mixed sol may be made by the process described above but adding silica particles to the alumina monohydrate before milling.

An alternative method of making an anionic sol containing colloidal alumina and colloidal silica is to mix an anionic silica sol with an acid cationic alumina sol, the amount of alkali and acid in the anionic and cationic sols respectively being such that the mixture is alkaline and has a sufficiently high pH value for the anionic mixed sol obtained to be stable. In this method the positively charged alumina particles of the cationic sol are converted to negatively charged particles on mixing with the alkaline silica sol.

The mixed alumina/silica sol may be used to form a refractory composition. One method of doing this is to flocculate the colloidal silica and alumina, for example by adding an electrolyte such as ammonium nitrate to the sol, filtering and drying the solid product and firing it at a temperature sufficient to form an aluminosilicate refractory material. A firing temperature in excess of 1200° C. is generally required. The ratio of the amounts of $Al_2O_3$ and $SiO_2$ in the sol may be such that the refractory material formed consists substantially of mullite, empirical formula $3Al_2O_3.2\ SiO_2$ which is a known highly refractory material.

Mullite may be formed in this way at a satisfactory rate using firing temperatures over 1300° C. but mullite formation may be accelerated by addition to the alumina/silica mixture of a mineralizer, for example magnesium oxide or a compound which yields magnesium oxide on firing. The duration of firing at a given temperature will then be less. The mineralizer may be incorporated in the mixture by soaking the flocculated mixture with a solution containing a dissolved compound, such as magnesium nitrate, which yields the mineralizer on firing.

Another method of incorporating a mineralizer in the mixed sol is to add the mineralizer as a solid to an aqueous suspension of the alumina before the latter is milled to form the alumina sol. The solid mineralizer is then reduced to colloidal sized particles together with the alumina. In this method the mineralizer may be magnesium oxide or a solid compound such as magnesium hydroxide or magnesium carbonate which produces magnesium oxide on subsequent firing.

The anionic mixed $Al_2O_3/SiO_2$ sol may be used in this way to produce shaped refractory articles. It may also be used as a binding agent for other refractory materials including refractory fibres, such as Kaowool (Registered Trade Mark of Morganite Ltd.) and Saffil (Registered Trade Mark of ICI) which are used for making refractory articles of low density and low heat capacity, and solid refractory bodies formed of alumina, aluminosilicate, zirconium silicate and other refractory materials.

When fibres are to be bonded together using the mixed sol, the fibres and the sol may be suspended together in water and the suspension flocculated to give a mass of intimately mixed fibres, alumina and silica which may be removed by filtration and formed to shape, or vacuum formed, dried and fired. When solid bodies are to be bound together the sol may simply be mixed with the bodies followed by forming to shape, drying and firing. The addition of a mineralizer is again desirable in order to reduce the firing time required at a particular temperature: when the fibres or bodies to be joined together comprise aluminosilicates which deteriorate when exposed to temperatures above 1260° C. the temperature of firing may be kept below 1260° C.

The sol may be flocculated by addition of an electrolyte such as ammonium nitrate but it has been found that improved bonding is obtained when a starch is used to flocculate the sol.

When the mixed sol is used as a binding agent it is preferred that the ratio of $Al_2O_3$ in the sol and the total amount of $SiO_2$ present should be such as to form mullite as the bonding compound with a minimum of free silica present in the fired body obtained. When the refractory fibres or bodies to be bonded themselves contain free silicon, the ratio of $Al_2O_3$ to $SiO_2$ in the mixed anionic sol may be increased so that the ratio of $Al_2O_3$ in the sol to total $SiO_2$ is greater than or equal to 72:28 by weight. The amount of free silica in the binder after firing, which affects the strength of the binder at high temperatures, is then minimised.

The alkaline anionic alumina sols or mixed sols may contain sodium hydroxide or other bases to provide the necessary pH value. When the base is volatile, for example ammonia, it is generally removed on firing an article formed of or containing the sol and this removal allows an article to be made containing no residual alkali. A non-volatile base may be replaced before firing with a volatile base such as ammonia by ion exchange.

Aspects of the invention will be illustrated by the following Examples.

EXAMPLE 1

Alumina trihydrate obtained from bauxite by the Bayer process and having an average particle diameter of about 50 microns was calcined at 400° C. in a static furnace and then quenched in deionised cold water. The solid product obtained consisted substantially of crystalline alumina monohydrate of average particle diameter about 50 microns. Some of the water was then removed by decantation and the solid product was milled with the remaining water in an attrition mill consisting of a bead mill loaded with zircon beads. A colloidal alumina sol dispersion having a particle size of the order of 100 nm was produced. The concentration of the sol was 30 g of $Al_2O_3$ per 100 ml of dispersion. The pH value of the dispersion was between 10 and 14.

The sol was anionic and highly stable on storage. after standing undisturbed for 1 month at ambient temperature, less than 5% of the alumina monohydrate had settled out. The sol could be dried to a powder without gel formation and the powder could be redispersed by agitation with water to reconstitute the sol. The reconstituted sol was stable on storage provided that the pH was above 8. The sol could be destabilized by reducing the pH value.

Both the dispersion initially obtained and the reconstituted dispersion were thixotropic.

Comparative Example 1

Alumina trihydrate obtained from bauxite by the Bayer process having an average particle diameter of about 50 microns was calcined and quenched as in Example 1. Some of the water was removed by decantation and the mixture of solid product and remaining water, at a concentration of about 40 g of $Al_2O_3$ per 100 ml dispersion, was mixed for 15 minutes in a high gear emulsifier mixer (an OBS Dispermix DL with a 70 mm mixing disc operated at 1800 RPM). The dispersion obtained was allowed to stand at ambient temperature without agitation. More than 95% of the solid material present settled out after 5 minutes.

Comparative Example 2

Gibbsite of average particle diameter about 1 micron was calcined at about 400° C. and the resulting product was fed into an air jet mill at a rate of 440 Kg/hour using an air supply pressure of 100 psig (7 Kg/cm²). The product obtained was dispersed in water at 40 g $Al_2O_3$/100 ml dispersion and allowed to stand unagitated at ambient temperature. More than 95% of the solid material settled out after 5 minutes.

These comparative examples demonstrate that merely dispersing the coarse alumina monohydrate obtained by calcining alumina trihydrate using high shear rates, as in U.S. Pat. No. 4244835 of Block, does not produce a stable sol as the particle size is not reduced to colloidal proportions. Also, calcination of gibbsite of particle size about 1 micron followed by air jet milling, but without autoclaving as described by U.S. Pat. No. 4,117,105 of Hertezenberg et al, did not produce a stable sol.

The anionic sol obtained could be mixed with an anionic silica sol to give a mixed sol which did not gel. Some properties of such mixed sols are described in the following Example.

EXAMPLE 2

Mixed alumina/silica sols of various $Al_2O_3/SiO_2$ ratios were prepared by mixing Nalflock 1030 (Registered Trade Mark of Nalflock Ltd.), an anionic colloidal silica dispersion containing 30 g of $SiO_2$ per 100 ml, with the alumina monohydrate dispersion obtained in Example 1. The $Al_2O_3/SiO_2$ ratios obtained are given in Table 1. The mixtures did not gel although they were thixotropic. The mixtures, together with pure Nalflock 1030 silica sol and the pure sol of Example 1, were stored for up to 20 days at 26° C. and the viscosities were measured at intervals after stirring. The results are shown in Table 1. It is evident from these results that the mixtures of anionic alumina sol/anionic silica sol were stable on storage in that they did not produce a permanent gel, although increasing the proportion of alumina sol increased the viscosity of the mixture and rendered it thixotropic. It was found that after 30 days storage the mixed sols showed no further change in viscosity.

Similar results were obtained when the anionic alumina sol was mixed with Sytoin X 30 (Registered Trade Mark of Monsanto Ltd.) another proprietary anionic colloidal silica dispersion.

EXAMPLE 3

This example illustrates the use of mixed alumina/silica anionic sols to make mullite.

A mixed sol was obtained by mixing the sol of Example 1 with an anionic silica sol to produce a sol containing 37.5% weight/weight solids and an $Al_2O_3/SiO_2$ weight ratio of 80:20. The sol was flocculated and the solid material obtained was filtered off and dried and divided into two portions 1 and 2: portion 2 was saturated with an aqueous solution of magnesium nitrate to give 1% by weight of MgO in the material after removal of water and nitrate. Samples of portions 1 and 2 were fired for 4 hours at 1150°, 1250°, 1350° C. and 1450° C. and later analyzed by X-ray diffraction to determine the phases present. The results are given in Table 2.

It is evident that substantially all the mixture is converted to mullite at a firing temperature above 1300° C. and that this conversion is accelerated at lower temperatures by the presence of a mineralizing agent, in this case magnesium oxide.

The following examples illustrate the use of mixed alumina/silica anionic sols as refractory bonding agents.

EXAMPLE 4

The mixed sol of Example 3 was used to bond an aluminosilicate fibre board by suspending 40 g aluminosilicate fibre in 4 litres of water containing 10 g of the mixed sol. The system was flocculated by adding ammonium nitrate after which the solid product was collected by vacuum filtration. The resulting board was dried and then treated with magnesium nitrate solution as in Example 3 before firing at 1250° C. to give a refractory article with a bulk density of 0.3 gcm$^{-3}$.

EXAMPLE 5

The anionic alumina gel of Example 1 and the mixed sol of Example 3 were used to bond aluminosilicate fibres by suspending 40 g aluminosilicate fibre in 4 litres of water containing 10 g of sol. The system was flocculated by the addition of 1% W/W WISPROFLOC P or WISPROFLOCK N (modified potato starches manufactured by Avebe Starches of Holland). The solid product was collected by vacuum filtration. These starches flocculated all the sol-fibre systems very effectively. The resulting boards had higher 'green' and 'fired' strengths than similar ones prepared using ammonium nitrate as the flocculating agent.

EXAMPLE 6

A tabular alumina grog having a particle size distribution comprising 45 wt% 3-5 mm, 15 wt% 0.5-1.5 mm and 40% pass 325 mesh was mixed with the mixed sol of Example 3 such that it contained 12 wt% of sol. The resultant mass was formed into a cylinder and dried at 80° C. Once dried the cylinder had sufficient green strength to be readily handled. After firing at 1500° C. for 4 hours the cylinder had undergone a linear shrinkage of 1.3% and had a cold crushing strength of approximately 100 kg cm$^{-2}$.

EXAMPLE 7

A tabular alumina grog having a graded size distribution in the range 0 to 5 mm was bonded with the sol of Example 1, with the mixed sol of Example 3 and with a calcium aluminate cement for comparison. In all cases the amount of solid in the binder was 3 wt% of the total dry mass of the mixture, and the water content was adjusted to achieve the same density for all samples. The resultant masses were formed into cylindrical test specimens 50 mm in diameter by 50± 1 mm thick. The calcium aluminate samples were cured at room temperatures for 24hrs and all samples were dried at 110° C. prior to firing. All of the samples had sufficient green strength to enable them to be handled. After firing to different temperatures for 4 hrs the samples were cooled and their cold crushing strengths were measured. Results are shown in Table 3.

EXAMPLE 8

The mixed sol of Example 3 was used to bond aluminosilicate fibres by suspending 40g aluminosilicate fibre in 4 litres of water containing 4.6g of sol. The system was flocculated by the addition of 8% w/w-WISPRO-FLOC P (modified potato starch manufactured by Avebe Starches of Holland). The solid product was collected by vacuum filtration. After drying at 100° C., the board had a bulk density of 0.235gcm$^{-3}$. The dried board was fired.

Compression tests were carried out at a load of 8.426 Kg.cm$^{-2}$ using a plunger of 0.3167cm$^2$. The degree of compression at various firing temperatures for the mixed sol board and a commercial ceramic board (Morganite-bulk density 0.26gcm$^{-2}$) are given in Table 4.

The mixed sol board was much stronger after firing at high temperatures than the Morganite ceramic board.

As stated above, anionic alumina sols may be used in combination with silica sols as refractory binders. They may also be used for many other purposes, including binding paper, making catalyst supports, coated abrasives and non-slip coatings. They may also be used as thixotropic agents in creams, jellies, ointments and paints, flocculating agents in water purification and as anti-static and anti-soiling agents in textiles.

In the sols described above the colloidal particles are dispersed in water. It is possible to use liquids other than water, for example polar organic solvents such as ethanol, as the dispersion medium. Mixtures of water and water-miscible organic liquids may also be used. An alumina sol comprising an organic liquid as the dispersion medium may form a stable mixture with organic silicon compounds such as ethyl silicate which are hydrolyzed by water and such mixtures may be used for making foundry moulds and other products.

TABLE 1

| Al$_2$O$_3$:SiO$_2$ Ratio | Viscosity (cps) | | | |
|---|---|---|---|---|
| | Initial | 1 Day | 10 Days | 20 Days |
| 100:0 | 165 | 120 | 175 | 170 |
| 80:20 | 160 | 150 | 260 | 210 |
| 50:50 | 32 | 28 | 20 | 20 |
| 20:80 | 21.5 | 20 | 18 | 18 |
| 0:100 | 20 | 19 | 20 | 19 |

TABLE 2

| Temperature °C. | % Mullite | | Other phases | |
|---|---|---|---|---|
| | Portion 1 | Portion 2 | Portion 1 | Portion 2 |
| 1150 | <2 | 2 | cristobalite | cristobalite |
| 1250 | 2 | 50 | α-Al$_2$O$_3$ | α-Al$_2$O$_3$ |
| 1350 | 90 | >95 | α-Al$_2$O$_3$ | none detected |
| 1450 | >95 | >95 | none detected | none detected |

TABLE 3

| | Cold crushing strengths in kg per sq cm. | | |
|---|---|---|---|
| | Firing temperature/°C. | | |
| Bonding agent | 800 | 1200 | 1600 |
| Anionic Alumina sol | 105 | 56 | 175 |
| Anionic Alumina/silica mixed sol | 70 | 390 | 490 |
| Calcium aluminate | 250 | 260 | 280 |

TABLE 4

| Firing Temperature (°C.) | % Compression Morganite Board | Mixed Sol Board |
|---|---|---|
| 100 | 4.46 | 17.5 |
| 200 | 4.28 | 14.5 |
| 500 | 33.03 | 33.25 |
| 1000 | 35.17 | 23.02 |

We claim:
1. A method of making a stable anionic sol containing anionic colloidal alumina hydrate which consists essentially of the steps of:
   (a) calcining alumina hydrate to form coarse particles of crystalline alumina monohydrate, and
   (b) reducing the average diameter of the coarse particles so formed to less than 1 micron in all dimensions by an operation consisting essentially of attrition milling said coarse particles with a dispersion liquid to produce a colloidal dispersion of the particles in the liquid.
2. A method according to claim 1, in which the dispersion liquid is an aqueous solution of an alkali.
3. A method according to claim 1, in which the alumina hydrate has been obtained from bauxite by the Bayer process.
4. A method according to claim 1, in which the alumina hydrate is calcined at from 300° C. to 750° C.
5. A method according to claim 1, in which the alumina monohydrate is quenched in water after calcining.
6. A method according to claim 1, in which the pH value of the colloidal dispersion produced is above 10.
7. A method according to claim 1, in which the relative proportions of dispersion liquid and the coarse particles are such as to produce a concentration of alumina monohydrate, measured as Al$_2$O$_3$, of 25 through 45 g per 100 ml of dispersion.
8. A method according to claim 1, in which the average diameter of the alumina hydrate calcined in step (a) is about 50 microns.
9. A method according to claim 1, in which a mineralizer or a compound which yields a mineralizer on firing is added to the calcined particles before milling.
10. A method according to claim 9, in which the mineralizer is magnesium oxide.
11. A method of making a mixed anionic sol containing anionic colloidal alumina hydrate and anionic colloidal silica in the dispersed state, which comprises mixing a stable anionic sol containing anionic colloidal alumina hydrate made by a method according to claim 1 with an anionic colloidal silica dispersion.

12. A method according to claim 11, in which a volatile base is incorporated in the mixed sol.

13. A method of making a stable mixed anionic sol containing anionic colloidal alumina hydrate and anionic colloidal silica in the dispersed state, which consists essentially of the steps of:
 (a) calcining alumina hydrate to form coarse particles of crystalline alumina monohydrate, and
 (b) reducing the average diameter of the coarse particles so formed to less than 1 micron in all dimensions by an operation consisting essentially of attrition milling said coarse particles with a dispersion liquid containing dispersed colloidal silica to produce a colloidal dispersion of alumina monohydrate and silica particles in the liquid.

14. A method of making a stable mixed anionic sol containing anionic colloidal alumina hydrate and anionic colloidal silica in the dispersed state, which consists essentially of the steps of:
 (a) calcining alumina hydrate to form coarse particles of crystalline alumina monohydrate,
 (b) mixing said particles with silica, and
 (c) reducing the average diameter of the coarse particles of crystalline alumina monohydrate to less than 1 micron in all dimensions by an operation consisting essentially of attrition milling the mixture so formed with a dispersion liquid to produce a colloidal dispersion of alumina monohydrate and the silica particles in the liquid.

* * * * *